(12) United States Patent
Westbrook et al.

(10) Patent No.: US 8,186,284 B2
(45) Date of Patent: May 29, 2012

(54) STUDENT DESK WITH BOOK BOX

(75) Inventors: Mack Daniel Westbrook, Temple, TX (US); Matthew Murphy Lafleur, Salado, TX (US); Lewis Dorsey Cox, Leeds, AL (US); Jeffrey Stout, Smyrna, GA (US)

(73) Assignee: Artco-Bell, Temple, TX (US)

( * ) Notice: Subject to any disclaimer, the term of this patent is extended or adjusted under 35 U.S.C. 154(b) by 0 days.

(21) Appl. No.: 13/175,418

(22) Filed: Jul. 1, 2011

(65) Prior Publication Data

US 2011/0315054 A1    Dec. 29, 2011

Related U.S. Application Data

(63) Continuation of application No. 11/603,532, filed on Nov. 22, 2006, now abandoned.

(51) Int. Cl.
*A47B 41/00* (2006.01)

(52) U.S. Cl. ............... 108/158.11; 108/147.21; 312/195; 403/109.2

(58) Field of Classification Search ................ 312/194, 312/195, 257.1; 108/19, 92, 147.15, 147.21, 108/50.11, 153.1, 156, 158.11; 248/188.1, 248/188.5, 188.8, 188.9; 403/109.1, 109.2, 403/109.3, 109.8, 329

See application file for complete search history.

(56) References Cited

U.S. PATENT DOCUMENTS

| | | | |
|---|---|---|---|
| 1,437,670 A | 12/1922 | Mazoch | |
| 2,547,296 A | 4/1951 | White | |
| 3,079,120 A | 2/1963 | Schwartz | |
| 3,164,351 A | 1/1965 | Rembowski | |
| D200,911 S | 4/1965 | Ginat | |
| 3,426,367 A | 2/1969 | Bradford | |
| D216,710 S | 3/1970 | Lambert | |
| 3,604,369 A | 9/1971 | Maslow | |
| 3,730,109 A | 5/1973 | Kreizel et al. | |
| 3,864,048 A | 2/1975 | Parker | |
| 3,865,050 A | 2/1975 | Cecchetti | |
| 4,085,763 A | 4/1978 | Thomas | |
| 4,247,216 A | 1/1981 | Pansini | |
| 4,672,898 A | 6/1987 | Davidson | |

(Continued)

OTHER PUBLICATIONS

International Search Report and Written Opinion for PCT/US2007/024139 dated Jun. 30, 2008.

*Primary Examiner* — James O Hansen
(74) *Attorney, Agent, or Firm* — McDermott Will & Emery LLP (57) ABSTRACT

The present invention is related to a desk structure. The desk structure comprises a writing surface, and a book box which is secured to the writing surface. A plurality of receiver sleeves are integrally molded with the book box. Each receiver sleeve has an outer wall and an inner wall. The inner wall of the receiver sleeve has a slot and a plurality of radially spaced ribs. The inner wall defines an opening. The desk structure further comprises a plurality of legs. Each leg has an upper leg portion. The upper leg portion of each leg is received by the inner wall opening of a corresponding receiver sleeve. Additionally, each upper leg portion includes a detent. The detent is adapted to engage a corresponding inner wall slot when the upper leg portion is received by the inner wall opening of the corresponding receiver sleeve. Thus, the detent both secures the leg to the book box and positions the upper leg portion within the opening.

26 Claims, 8 Drawing Sheets

U.S. PATENT DOCUMENTS

| | | |
|---|---|---|
| 4,852,837 A | 8/1989 | Merten et al. |
| 5,096,186 A * | 3/1992 | Wilkinson et al. .............. 482/52 |
| 5,107,775 A | 4/1992 | Langlais et al. |
| 5,556,181 A | 9/1996 | Bertrand |
| 5,730,081 A | 3/1998 | Tsengas |
| 5,779,386 A | 7/1998 | Eichhorn |
| 6,079,894 A | 6/2000 | Obitts |
| D427,804 S | 7/2000 | Olson |
| D473,399 S | 4/2003 | Holbrook et al. |
| D474,044 S | 5/2003 | Holbrook et al. |
| 6,662,732 B2 | 12/2003 | Birsel et al. |
| 6,920,834 B1 | 7/2005 | Pehta et al. |
| 7,066,676 B2 | 6/2006 | Tsai |
| D559,579 S | 1/2008 | Bosman |
| D625,532 S | 10/2010 | Cox et al. |
| 2004/0194678 A1 | 10/2004 | Waner |
| 2008/0136296 A1 | 6/2008 | Westbrook et al. |

\* cited by examiner

STUDENT DESK WITH BOOK BOX

CROSS REFERENCE TO RELATED APPLICATIONS

This application is a continuation of U.S. patent application Ser. No. 11/603,532 filed on Nov. 22, 2006 now abandoned.

TECHNICAL FIELD

The present invention generally relates to desks, and more specifically, to a student desk structure having a book box.

BACKGROUND OF THE INVENTION

Student desks are commonly used in classrooms for storing books and other educational materials. Many structural configurations for desks use a book box in connection with a frame and legs. Known student desks use a welded metal frame. The metal frame both supports the book box and receives the legs, attaching them to the book box.

Although book boxes have been constructed of plastic in the past, they have not provided any structural support for the accompanying legs and desktop. A metal frame has been used with these plastic book boxes in order to provide the necessary support for the desk box and to connect the legs to the book box. The difficulty in using a welded metal frame is that while it provides the proper support and connection, it is very bulky. The metal frame takes up valuable cargo space in a truck or container, making it difficult and costly to transport the desks.

Further, if a desk structure is shipped without the metal frame attached, assembly generally requires the use of tools and takes a number of steps. Thus, attempts to solve the shipping problem by shipping the desk structure, disassembled from the welded metal frame and legs have not been adequate.

Additionally, known student desks can be easily disassembled. This creates a potential hazard in the classroom. Students may be able to take apart the individual metal pieces of their desk structures, and use the metal pieces as weapons. Therefore, a desk structure that is not easily disassembled is needed.

The present invention is provided to solve the above and other problems, and to provide advantages and aspects not previously provided. A full discussion of the features and advantages of the present invention is deferred to the following detailed description, which proceeds with reference to the accompanying drawings.

SUMMARY OF THE INVENTION

The desk structure of the present invention comprises a writing surface, secured to a book box. A plurality of receiver sleeves are integrally molded with the book box. Each receiver sleeve has an outer wall and an inner wall. The inner wall has a slot and a plurality of radially spaced ribs. The inner wall defines an opening. The desk structure further comprises a plurality of legs, each with an upper leg portion. The upper leg portion of each leg is received by the inner wall opening of a corresponding receiver sleeve. Each upper leg portion includes a detent adapted to engage a corresponding inner wall slot when the upper leg portion is received by the inner wall opening of the corresponding receiver sleeve.

In one embodiment, the detent is a protrusion that extends outward from and perpendicular to the upper leg portion. The detent partially retracts into the upper leg portion as the upper leg portion is received by the inner wall opening. The detent returns to the extended outward position and engages the slot once the upper leg portion is fully received by the opening, positioning the upper leg portion within the opening.

Once the detent engages the slot, movement of the upper leg portion is substantially prevented. The ribs of the receiver sleeve inner wall form a press fit with the upper leg portion to further secure the upper leg portion within the opening.

In another embodiment, the leg of the desk structure includes a lower leg portion and a leg extension member. The extension member is telescopically received by the lower leg portion. Each extension member includes a plurality of vertically aligned holes. Each lower leg portion includes a plurality of vertically aligned holes, which correspond to the holds of the extension member.

BRIEF DESCRIPTION OF THE DRAWINGS

A better understanding of the present invention can be obtained by considering the following detailed description and the accompanying drawings in which.

DETAILED DESCRIPTION

While the present invention is susceptible of many different embodiments, there is shown in the drawings and will herein be described in detail preferred embodiments of the invention with the understanding that the present disclosure is to be considered an exemplification of the principles of the invention and is not intended to limit the broad aspect of the invention to the embodiments illustrated.

Figure 1:
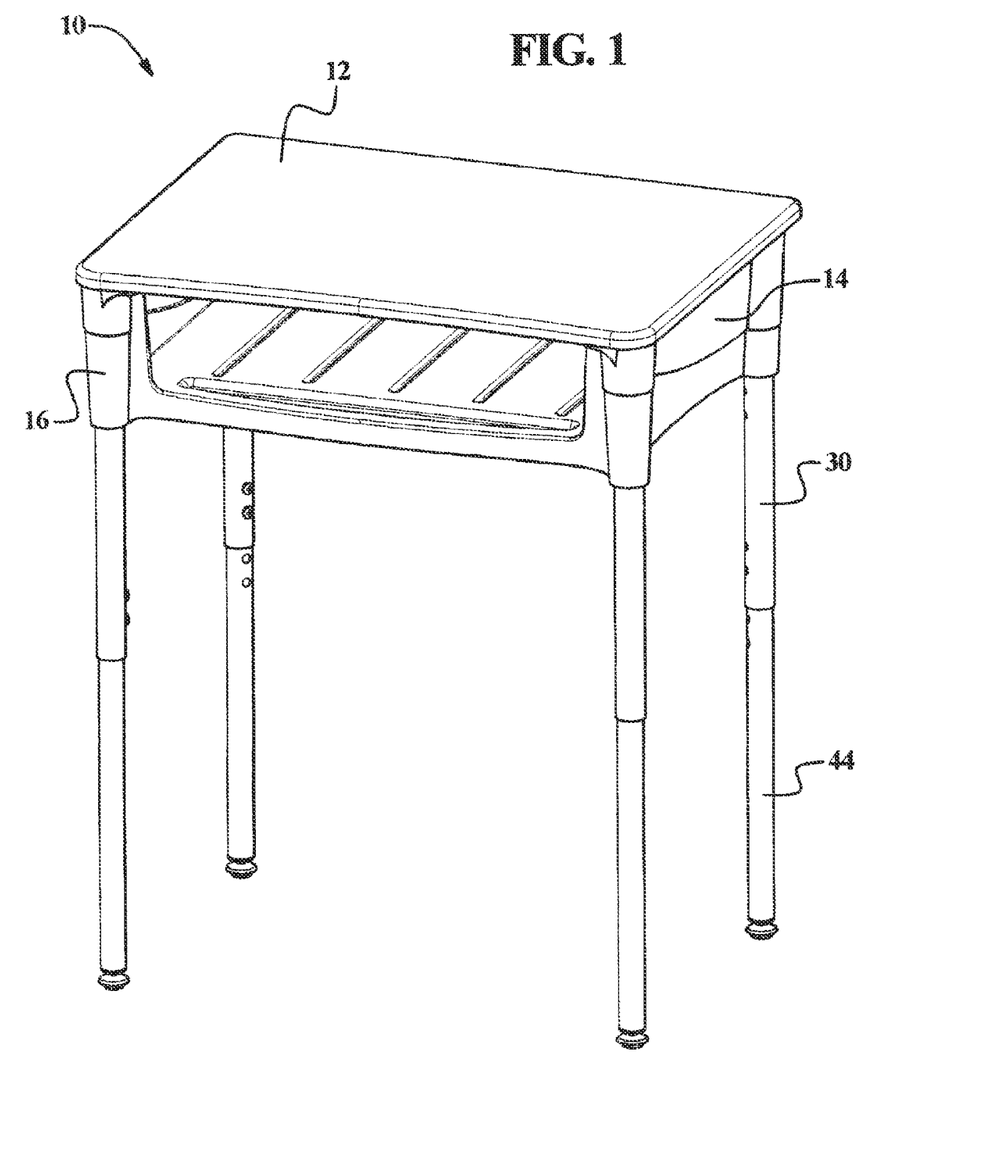
FIG. 1 is a perspective front view of an example of a desk structure in an embodiment of the present invention.
Figure 2:
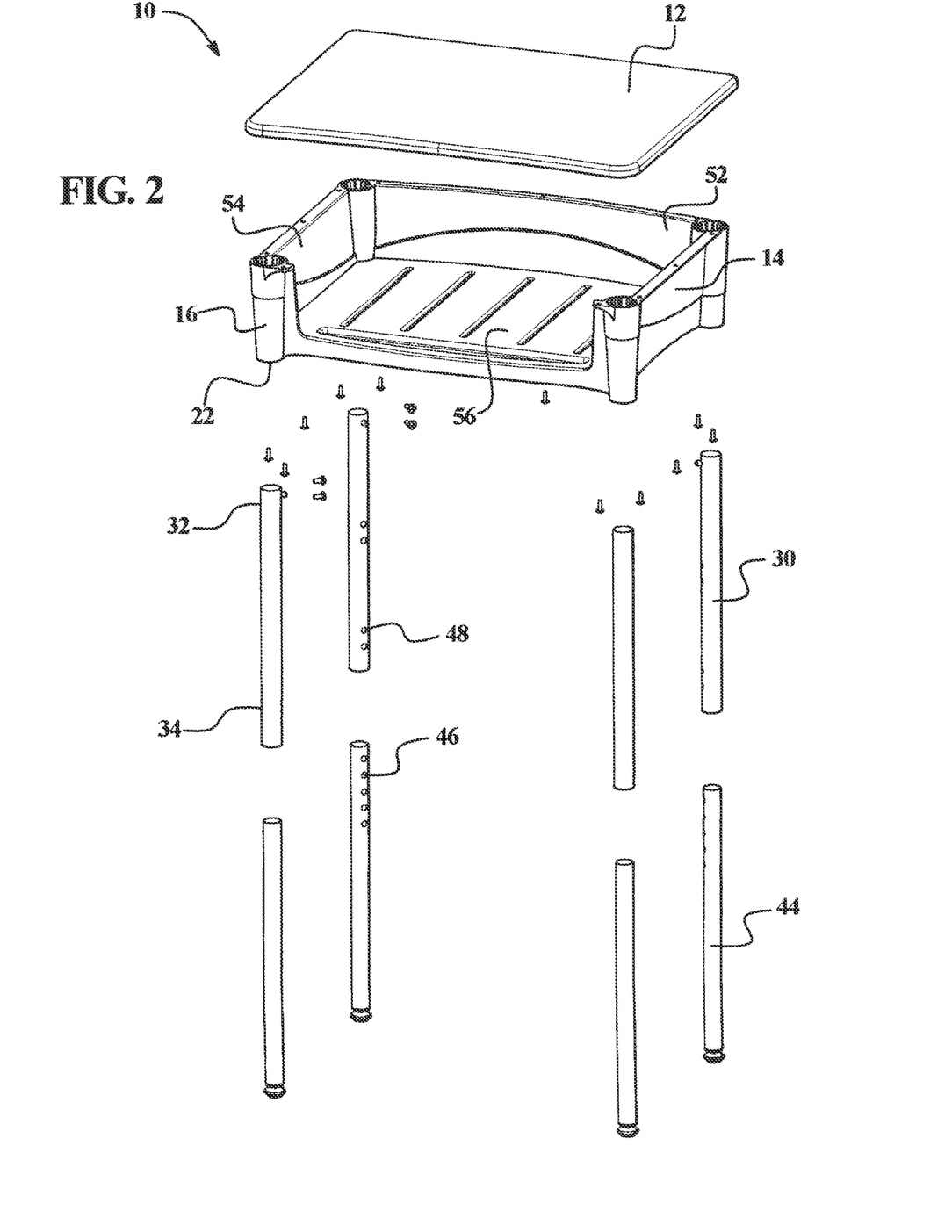
FIG. 2 is an exploded perspective front view of an example of a desk structure in an embodiment of the present invention.

FIGS. 1 and 2 show a perspective front view of an example of a desk structure 10. The desk structure 10 comprises a writing surface 12 secured to a book box 14. The writing surface 12 may be secured using fasteners, preferably screws. However, other fasteners may be used, such as pins or bolts. Other methods of attachment are possible as well, including hingeably attaching the writing surface 12 to the book box 14. The writing surface 12 lays substantially flat on the book box 14 so that students may easily write on it or place other objects upon it. Placement of the writing surface 12 on the book box 14 completes the intended volume of the book box 14 for holding learning materials. The writing surface 12 may be constructed of a single molded material, a lamination of wood products and melamine laminates, or a variety of other materials.

The desk structure 10 further includes a plurality of receiver sleeves 16 located about the exterior of the book box 14. Preferably, the receiver sleeves 16 are each integrally molded with the book box 14 at each of the four corners of the book box 14. However, the receiver sleeves 16 may be located at other locations of the book box 14. In one embodiment, the receiver sleeves are cylindrically tapered; however, the receiver sleeves 16 may be formed with other internal and external geometries. While the book box 14 and receiver sleeves 16 are preferably made out of molded plastic, other suitable materials may be used.

Figure 3:
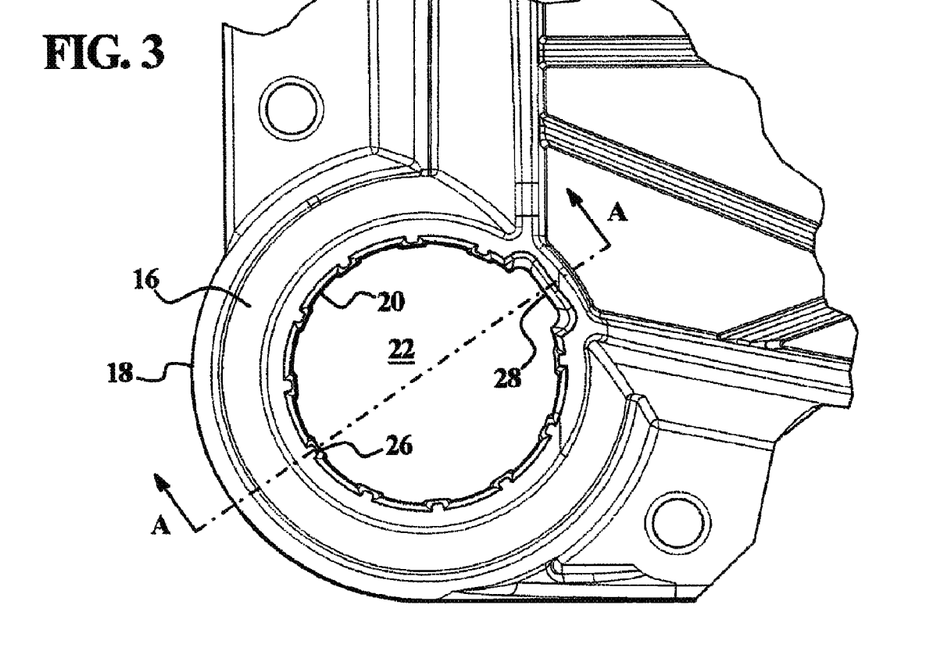
FIG. 3 is a bottom view of an example of a receiver sleeve in an embodiment of the present invention.
Figure 4:
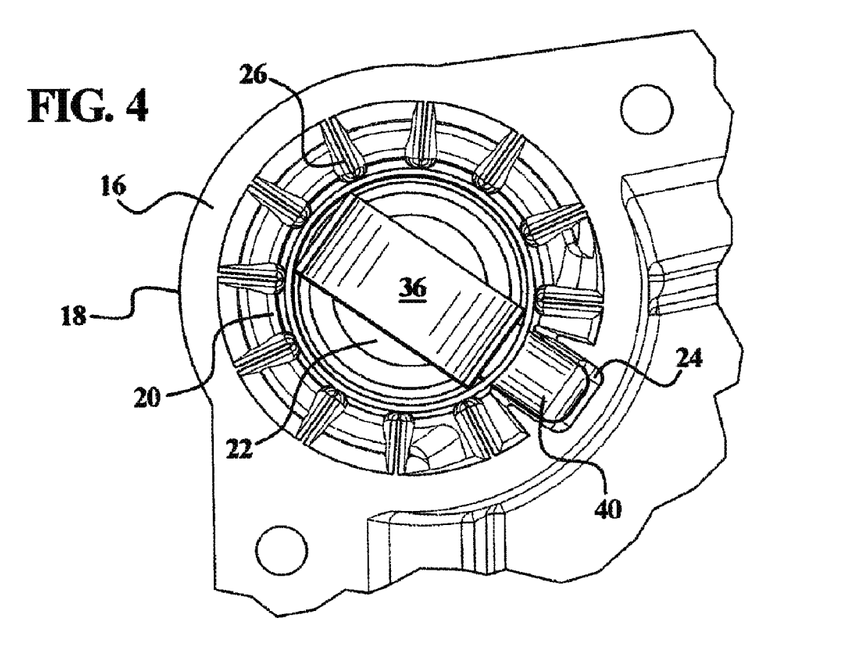
FIG. 4 is a top hidden-line view of an example of a receiver sleeve and detent in an embodiment of the present invention.
Figure 5:
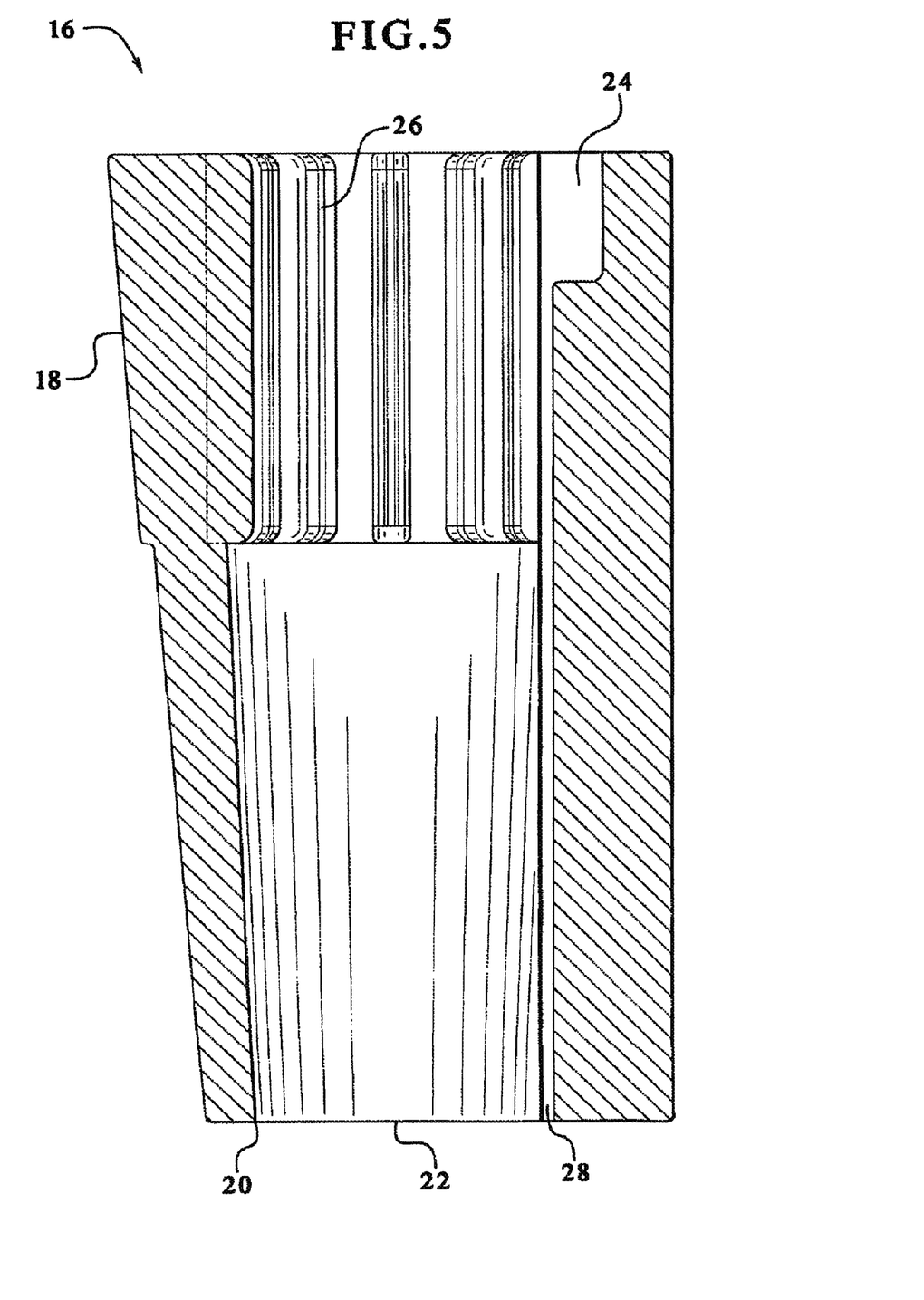
FIG. 5 is a cross-sectional view of an example of a receiver sleeve in an embodiment of the present invention.

As shown by FIGS. 3-5, each receiver sleeve 16 has an outer wall 18 and an inner wall 20. The inner wall 20 defines an opening 22. The inner wall 20 has a slot 24 and a plurality of radially spaced ribs 26. The slot 24 and ribs 26 are integrally molded with the receiver sleeve 16. In addition, the inner wall 20 may include a guiding notch 28, which is also integrally molded with the receiver sleeve 16. The notch 28 extends along the full length of the receiver sleeve 16, and its depth varies due to the tapered shape of the receiver sleeve 16. The notch is positioned so that it is aligned with the slot 24, as shown by FIG. 5. In a preferred embodiment, the slot 24 and ribs 26 are located near the top of the receiver sleeve inner wall 20. However, the slot 24 and ribs 26 may be located at alternative positions of the inner wall 20.

As shown by FIGS. 1 and 2, the desk structure 10 further comprises a plurality of legs 30. Each leg 30 includes an upper leg portion 32. The upper leg portion 32 of each leg 30 is received by the inner wall opening 22 of a corresponding receiver sleeve 16. The receiver sleeves 16 act to secure the legs 30 to the book box 14. Thus, because the receiver sleeves 16 are integrally molded with the book box 14, the plastic book box 14 both provides structural support for the desk structure 10 and connects the legs 30 to the book box 14. This eliminates the need for a bulky metal frame.

Figure 6:
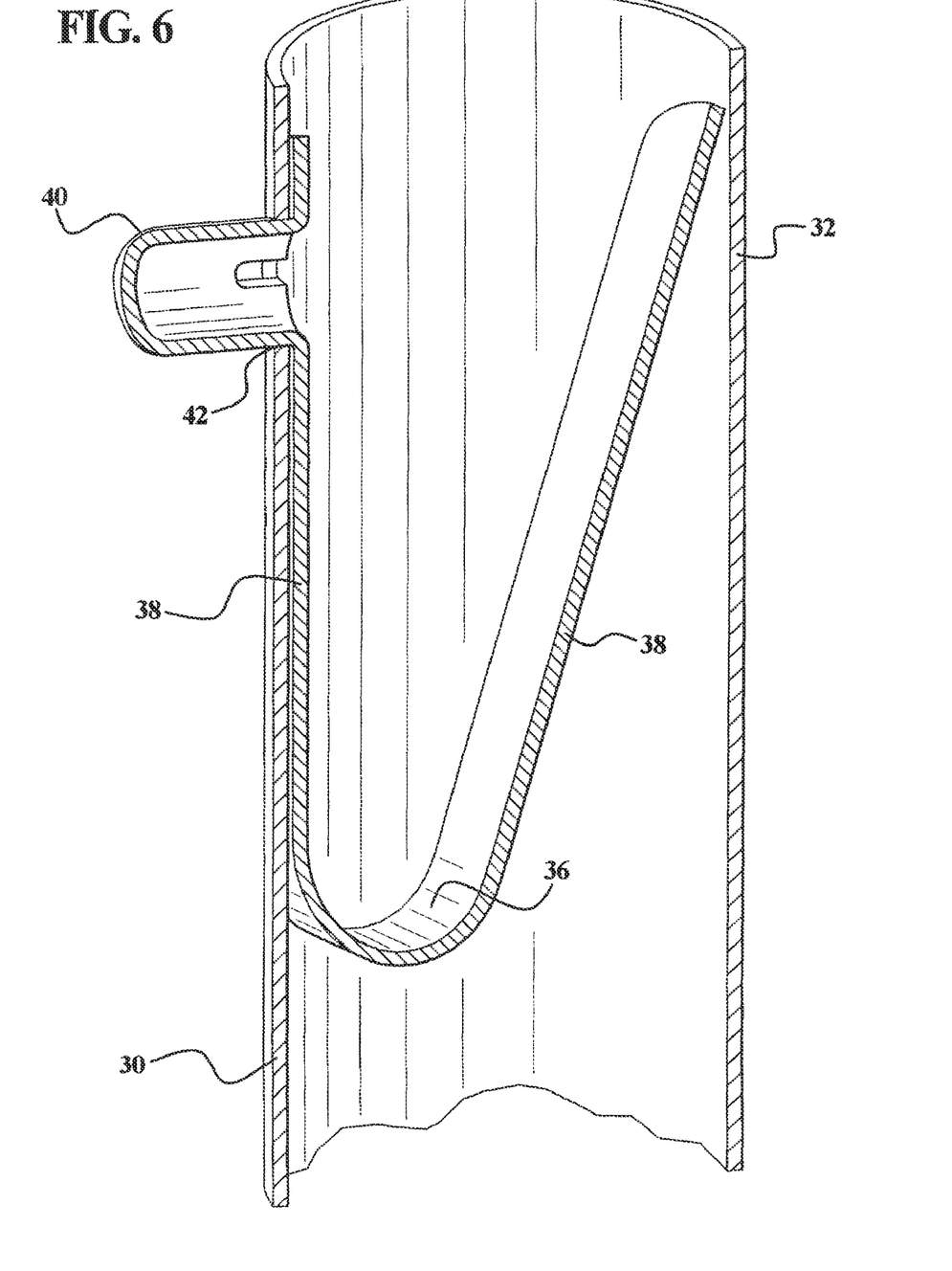
FIG. 6 is a perspective view of an example of a detent and upper leg portion in an embodiment of the present invention.

As shown by FIG. 6, each upper leg portion 32 includes a detent 36. The detent 36 is adapted to engage a corresponding inner wall slot 24 when the upper leg portion 32 is received by the inner wall opening 22 of the corresponding receiver sleeve 16, as shown by FIG. 4. Thus, the detent 36 secures the leg 30 to the receiver sleeve 16 of the book box 14. In one embodiment, the detent 36 is a protrusion that extends outward from and perpendicular to the upper leg portion 32. By engaging the slot 24, the detent 36 positions the upper leg portion 32 within the opening 22.

Figure 7:
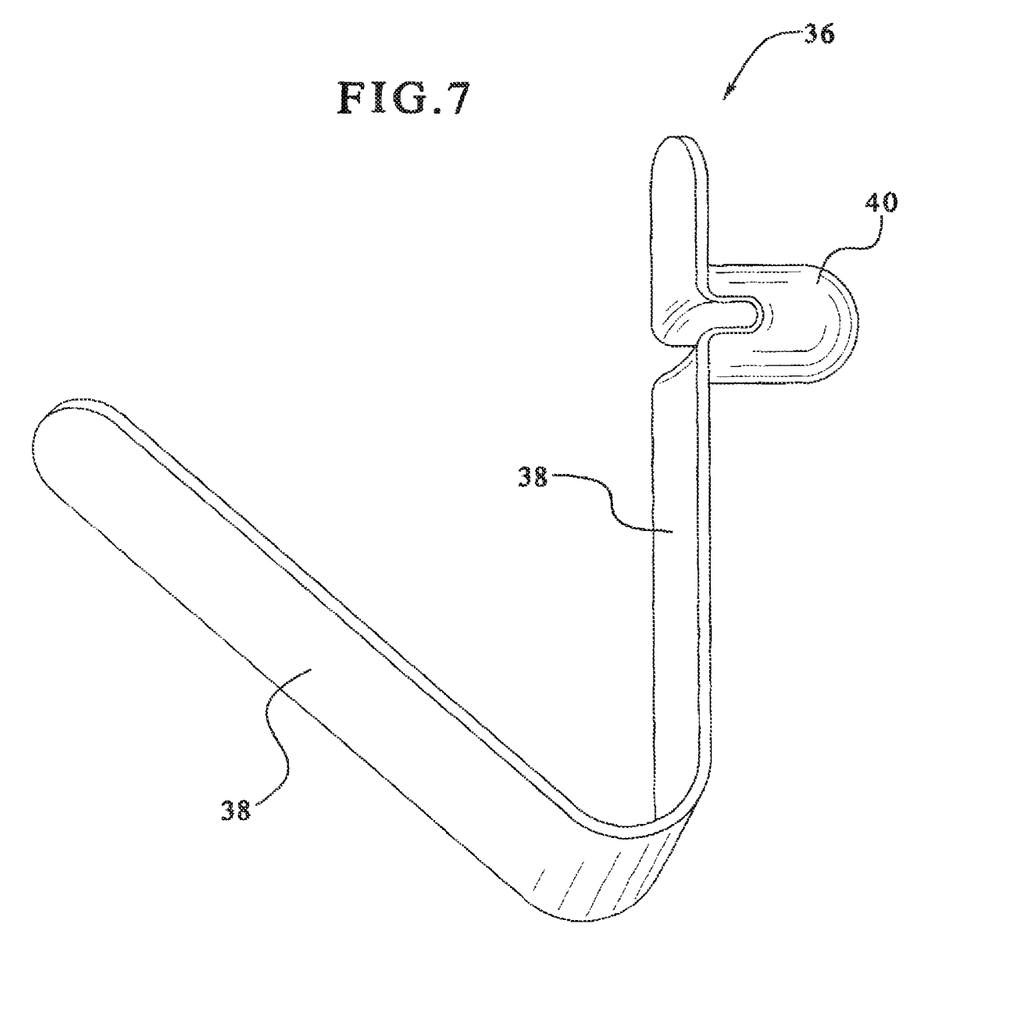
FIG. 7 is a perspective view of an example of a detent in an embodiment of the present invention.

In one embodiment, the detent 36 may be a snap button. Acceptable types of snap buttons 36 include those manufactured out of 1050 Spring Steel by Valco®/Valley Tool and Die, Inc., 10020 York Theta Drive, North Royalton, Ohio 44133. As shown in FIG. 7, the snap button 36 may be generally V-shaped, having two prongs 38, wherein one prong 38 includes a button head 40. Other types of snap buttons may also be used. The snap button 36 is spring-loaded. To position the snap button 36 within the upper leg portion 32, the prongs 38 are compressed, and the button snap 36 is placed in the upper leg portion 32. As shown by FIG. 6, the snap button 36 may be positioned such that the prong 38 with the button head 40 is generally parallel to the upper leg portion 32. The spring-loaded force creates a press fit between the prongs 38 and the upper leg portion 32. This secures the snap button 36 within the upper leg portion 32. The snap button 36 is further positioned so that the button head 40 of the snap button 36 extends outward from and perpendicular to the upper leg portion 32 through an aperture 42, as shown in FIG. 6. While a V-shaped Valco snap button 36 is preferred, other snap buttons may be used as well. Furthermore, other types of detents 36, other than snap buttons, may also be used to position and secure the upper leg portion 32 within the opening 22.

When the upper leg portion 32 is inserted into opening 22, the upper leg portion is initially oriented so that the button head 40 of the snap button 36 is aligned with the notch 28.

The notch 28 guides the upper leg portion 32 so that the snap button 36 will properly engage the slot 24 of the inner wall 20. Once the upper leg portion 32 is properly aligned, force is applied to slide the upper leg portion 32 into the opening 22. This force causes the button head 40 of the snap button 36 to partially retract back into the upper leg portion 32 as the upper leg portion 32 is received by the inner wall opening 22. The press fit between the prongs 38 of the snap button 36 and the upper leg portion 32 prevents the snap button 36 from substantially moving as the button head 40 retracts through the aperture 42. Further, because the button head 40 slides up the notch 28, it does not need to fully retract into the upper leg portion 32 as the upper leg portion 32 is received by the opening 22. The snap button 36 will return to the extended outward position and engage the slot 24 once the upper leg portion 32 is fully received by the opening 22. As mentioned above, other snap buttons 36 may be used. For example, the snap button 36 may include a button head 40 that extends out from the upper leg portion 32 in a different direction. Further, while a snap button is preferred, other suitable detents 36 may also be used.

The leg 30 may also be connected to the book box 14 by inserting the leg 30 into the receiver sleeve 16 through the top portion of the receiver sleeve 16, opposite the opening 22. The leg 30 is inserted into the receiver sleeve 16 until the upper leg portion 32 is received by the inner wall 20 of the receiver sleeve 16. Because the detent 36 is located at the upper leg portion 32, the detent 36 can essentially be dropped into the slot 24, as opposed to retracting and then extending into the slot 24. The detent 36 can be aligned with the slot 24 after insertion of the leg 30 has begun by simply rotating the leg 30. Thus, there is no need to perform the initial alignment with the notch 28. However, the leg 30 can only be inserted into the top portion of the receiver sleeve 16 if the writing surface 12 is not yet secured to the book box 14.

Once the detent 36 engages the slot 24, movement of the upper leg portion 32 is substantially prevented. The detent 36 cannot be easily accessed once it has engaged the slot 24 and the writing surface 12 has been secured to the book box 14. As shown by FIG. 4, the slot 24 does not extend past the outer wall 18 of the receiver sleeve 16. Thus, the detent 36 is essentially enclosed by the receiver sleeve 16 when the detent 36 is engaged with the slot 24. Additionally, the detent 36 is covered by the writing surface 12. Therefore, once the writing surface 12 is secured to the book box 14 and the upper leg portion 32 is received by the opening 22, the detent 36 is essentially tamper proof. It is not accessible without disassembling the desk structure 10 by removing the writing surface 12. This ensures that students will not be able to disassemble the desk structure 10 and potentially injure themselves, thereby creating for a safer classroom environment.

Once the upper leg portion 32 is received by the opening 22 of the inner wall 20, the ribs 26 of the receiver sleeve inner wall 20 form a press fit with the upper leg portion 32. This further secures the upper leg portion 32 within the opening 22, creating stability for the desk structure 10. The ribs 26 may be used in conjunction with the detent 36, or the ribs 26 alone may be used to ensure that the upper leg portion 32 is secured within the opening 22.

Additionally, the tapered shape of the receiver sleeves 16 increases the stability of the legs 30. The narrower and more tapered bottom of the receiver sleeve 16 decreases the amount of excess room between the receiver sleeve inner wall 20 and the upper leg portion 32. Thus, there is less "wobble room" for the legs 30.

No tools are required to connect the legs 30 to the book box 14, as the detent 36 and the ribs 26 secure the upper leg portion 32 within the opening 22. This reduces the time and cost associated with assembly. Further, transportation of the desk structure 10 without the legs 30 attached allows for easier storage and shipment. The individual components of the desk structure 10 can easily be stacked into a more compact formation. This is in stark contrast to current desks which have bulky metal frames and are difficult to economically ship. The ease of assembly provided by the present invention reduces the need to assemble the desk structure 10 prior to shipping. Thus, a greater number of desk structures 10 may be shipped in each shipment. The end result is a much more cost-effective method of shipping the desk structures 10.

In another embodiment, as shown by FIGS. 1 and 2, the leg 30 includes a lower leg portion 34 and a leg extension member 44. Each extension member 44 is telescopically received by the lower leg portion 34. Thus, the extension member 44 should be sized to be receivable by the lower leg portion 34. Each extension member 44 includes a plurality of vertically aligned holes 46. Additionally, each lower leg portion 34 may include a plurality of vertically aligned holes 48. The holes 48 of the lower leg portion 34 allow for a range of different assembly heights.

Figure 8:
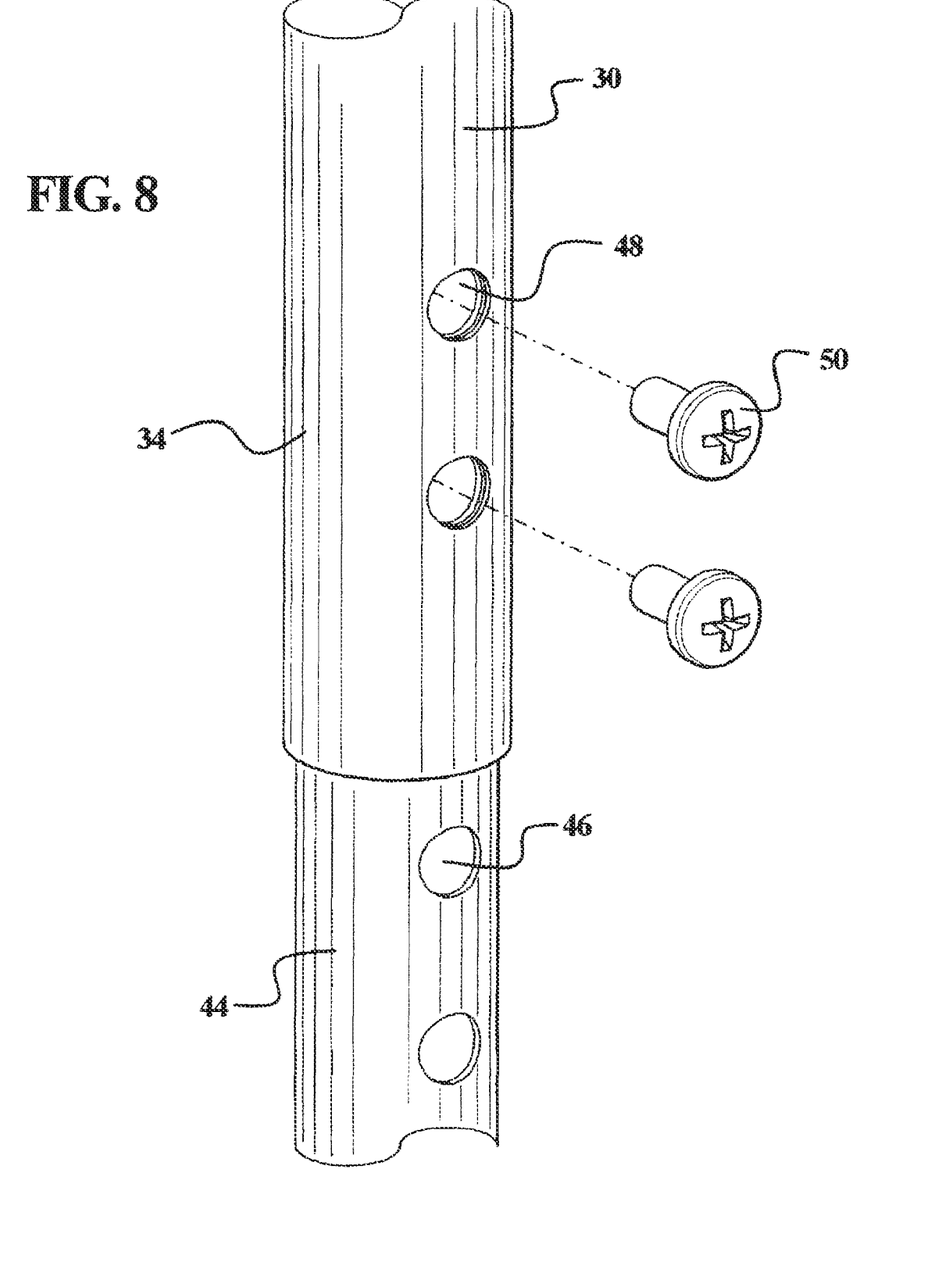
FIG. 8 is a perspective view of an example of a lower leg portion telescopically receiving an extension member in an embodiment of the present invention.

As shown by FIG. 8, the lower leg holes 48 are designed to correspond to the extension member holes 46. Thus, when the extension member 44 is received by the lower leg portion 34, the holes 46 of the extension member 44 and the holes 48 of the lower leg portion 34 can be lined up such that a range of heights can be achieved. For example, the lower leg portion 34 may receive nearly the entire length of the extension member 44 in order to provide for a shorter desk structure 10. Alternatively, the extension member 44 may be extended to its maximum height, in which case a minimum amount of the extension member 44 is received by the lower leg portion 34. In either scenario, the extension member 44 will provide enough support to ensure the stability of the desk structure 10.

One or more fasteners 50 pass through aligned holes 46 of the extension member and holes 48 of the lower leg portion. Preferably, the fasteners 50 are screws. However, other fasteners such as pins or bolts may also be used to secure the extension member 44 to the lower leg portion 34. When the preferred screws are used, the holes 46 of the extension member 44 are formed, punched, and tapped. The fasteners 50 secure the extension member 44 to the lower leg portion 34 at the desired height, ensuring that movement of the extension member 44 will be substantially prevented. Preferably two or more fasteners 50 are used to secure the extension member 44; however, it is contemplated that only one fastener 50 may secure the extension member 44 to the lower leg portion 34. Alternatively, the desk structure 10 may be tall enough without attachment of the extension members 44, wherein the legs 30 alone may provide the book box 14 with sufficient stability and height.

As shown in FIG. 2, the book box 14 may comprise a back wall 52, two side walls 54, and a bottom wall 56. As mentioned above, the walls are preferably formed from molded plastic. The two side walls 54 are parallel to one another and perpendicular to the back wall 52. The bottom wall 56 is perpendicular to the back wall 52 and substantially parallel to the writing surface 12. The walls 52, 54, and 56 of the book box 14 are integrally molded with one another. Thus, the book box 14 is enclosed on five sides. In one embodiment, the front of the book box 14 is open for easy access to books and other educational materials. However, it is also contemplated that the book box 14 may comprise a closed volume, in which all six sides of the box are closed. Additionally, the walls 52, 54, and 56 of the book box may form other geometries. As shown in FIG. 2, the receiver sleeves 16 are located adjacent to the side wall 54 and bottom wall 56. This configuration, with the receiver sleeves 16 located at the four corners of the book box 14, allows for maximum utilization of the storage volume provided by the book box 14.

Figure 9:
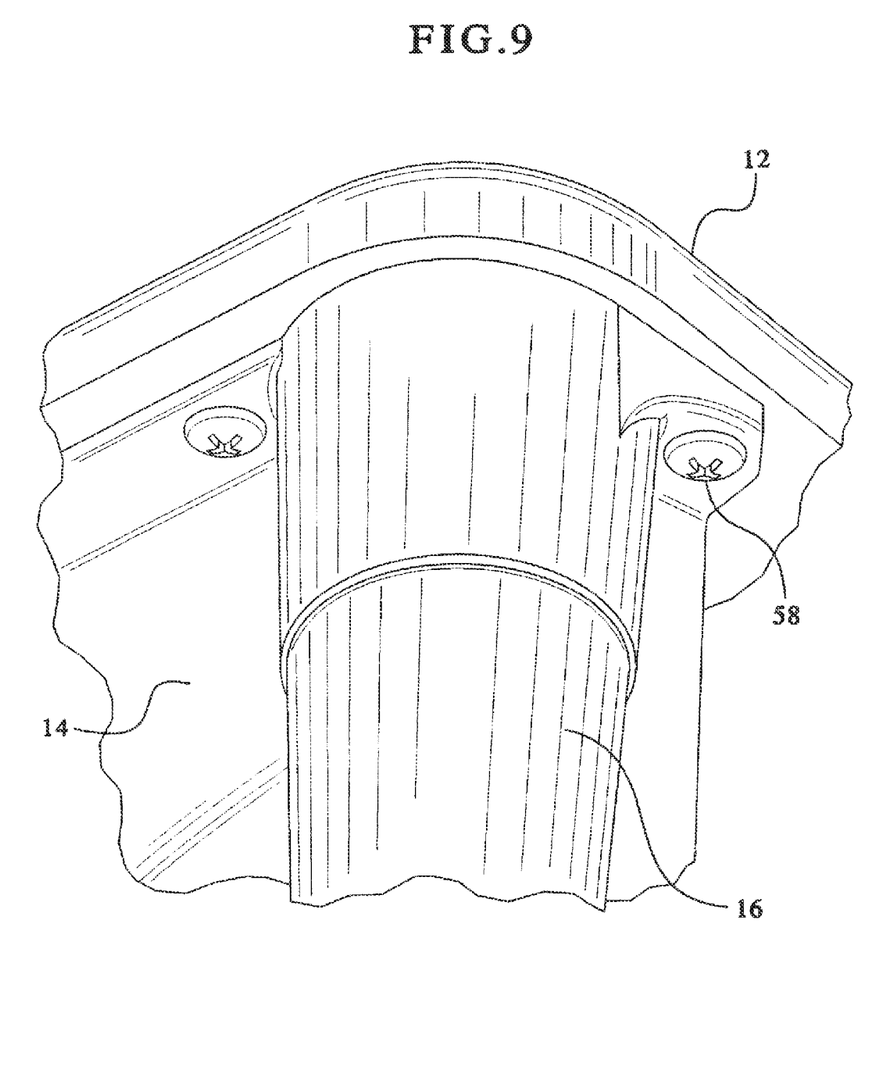
FIG. 9 is a bottom perspective view of an example of fasteners securing the writing surface to the book box in an embodiment of the present invention.

In another embodiment, as shown in FIG. 9, a fastener 58 secures the writing surface 12 to the book box 14. The side and back walls 54, 52 include flanges at multiple peripheral locations for securing the writing surface 12 to the book box 14. A fastener 58, preferably a screw, passes through the underside of the flanges and secures the bottom of the writing surface 12 to the book box 14. Other fasteners such as pins or bolts may also be used. This configuration positions the fasteners 58 so that they are not protruding from the desk structure 10 in an unseemly fashion. Alternatively, as mentioned above, the writing surface 12 may be hingeably attached such that it can open and close, while staying connected to the book box 14.

While the specific embodiments have been illustrated and described, numerous modifications come to mind without significantly departing from the spirit of the invention, and the scope of protection is only limited by the scope of the accompanying Claims.

What is claimed is:

1. A desk structure comprising:
   a writing surface;
   a book box secured to the writing surface;
   a plurality of receiver sleeves integrally molded with the book box, each receiver sleeve having an outer wall and an inner wall, the inner wall having a slot that does not extend completely through the receiver sleeve to the outer wall and a plurality of radially spaced ribs, the inner wall defining an opening;
   a plurality of legs, each leg having an upper leg portion, wherein the upper leg portion of each leg is received by the inner wall opening of a corresponding receiver sleeve;
   each upper leg portion including a detent engaging a corresponding inner wall slot when the upper leg portion is received by the inner wall opening of the corresponding receiver sleeve;
   wherein each detent is completely enclosed by each corresponding receiver sleeve and wherein each detent is only accessible by removing the writing surface from the book box.

2. The desk structure of claim 1, wherein the detent is a protrusion that extends outward from and perpendicular to the upper leg portion, positioning the upper leg portion within the opening.

3. The desk structure of claim 2, wherein the detent partially retracts into the upper leg portion as the upper leg portion is received by the inner wall opening, the detent returning to the extended outward position and engaging the slot once the upper leg portion is fully received by the opening.

4. The desk structure of claim 3, wherein the detent is a snap button comprising two prongs and a button head.

5. The desk structure of claim 1, wherein once the detent engages the slot, movement of the upper leg portion is substantially prevented.

6. The desk structure of claim 1, wherein the ribs of the receiver sleeve inner wall form a press fit with the upper leg portion to secure the upper leg portion within the opening.

7. The desk structure of claim 1, wherein each leg includes a lower leg portion and a leg extension member, the leg extension member being telescopically received by the lower leg portion.

8. The desk structure of claim 7, wherein each extension member includes a plurality of vertically aligned holes.

9. The desk structure of claim 8, wherein each lower leg portion includes a plurality of vertically aligned holes, the holes of the lower leg portion corresponding to the holes of the extension member.

10. The desk structure of claim 9, wherein a fastener passes through the corresponding holes of the extension member and the lower leg portion and secures the extension member to the lower leg portion.

11. The desk structure of claim 1, wherein the book box defines a volume for receiving learning materials and is an integrally molded structure comprising a back wall, two side walls, and a bottom wall.

12. The desk structure of claim 1 wherein the upper leg portion can only be removed from the receiver sleeve by removing the writing surface from the book box.

13. A desk structure comprising:
a writing surface;
a book box secured to the writing surface;
a plurality of receiver sleeves integrally molded with the book box, each receiver sleeve having an outer wall and an inner wall, the inner wall having a slot that does not extend completely through the receiver sleeve to the outer wall and a plurality of radially spaced ribs, the inner wall defining an opening;
a plurality of legs, each leg having an upper leg portion, wherein the upper leg portion of each leg is received by the inner wall opening of a corresponding receiver sleeve;
each upper leg portion including a detent engaging a corresponding inner wall slot when the upper leg portion is received by the inner wall opening of the corresponding receiver sleeve; wherein each detent is completely enclosed by each corresponding receiver sleeve and once the detent engages the slot, movement of the upper leg portion is substantially prevented and the upper leg portion can only be removed from the receiver sleeve by removing the writing surface from the book box.

14. The desk structure of claim 13, wherein the detent is a protrusion that extends outward from and perpendicular to the upper leg portion, the detent partially retracting into the upper leg portion as the upper leg portion is received by the inner wall opening, the detent returning to the extended outward position and engaging the slot once the upper leg portion is fully received by the opening, the detent positioning the upper leg within the opening.

15. The desk structure of claim 13, wherein the ribs of the receiver sleeve inner wall form a press fit with the upper leg portion to secure the upper leg portion within the opening.

16. The desk structure of claim 13, wherein each leg includes a lower leg portion and a leg extension member, the leg extension member being telescopically received by the lower leg portion.

17. The desk structure of claim 16, wherein the lower leg portion includes a plurality of vertically aligned holes that correspond to a plurality of vertically aligned holes on the extension member.

18. The desk structure of claim 13, wherein the book box comprises a back wall, two side walls, and a bottom wall.

19. The desk structure of claim 18, wherein the receiver sleeve is adjacent to one side wall and the bottom wall.

20. The desk structure of claim 13 wherein each detent is only accessible by removing the writing surface from the book box.

21. A desk structure comprising:
a writing surface;
a book box secured to the writing surface;
a plurality of receiver sleeves integrally molded with the book box, each receiver sleeve having an outer wall and an inner wall, the inner wall having a slot that does not extend completely through the receiver sleeve to the outer wall and a plurality of radially spaced ribs, the inner wall defining an opening;
a plurality of legs, each leg having an upper leg portion, wherein the upper leg portion of each leg is received by the inner wall opening of a corresponding receiver sleeve;
each upper leg portion including a detent engaging a corresponding inner wall slot when the upper leg portion is received by the inner wall opening of the corresponding receiver sleeve; wherein each detent is completely enclosed by each corresponding receiver sleeve and the upper leg portion can only be removed from the receiver sleeve by removing the writing surface from the book box.

22. The desk structure of claim 21, wherein the detent is a protrusion that extends outward from and perpendicular to the upper leg portion, the detent retracting into the upper leg portion as the upper leg portion is received by the inner wall opening, the detent returning to the extended outward position and engaging the slot once the upper leg portion is fully received by the opening, the detent positioning the upper leg within the opening.

23. The desk structure of claim 21, wherein each leg includes a lower leg portion and a leg extension member, the leg extension member being telescopically received by the lower leg portion.

24. The desk structure of claim 22 wherein once the detent engages the slot, rotational movement of the upper leg portion is prevented.

25. The desk structure of claim 24, wherein the ribs of the receiver sleeve inner wall form a press fit with the upper leg portion to secure the upper leg portion within the opening.

26. The desk structure of claim 25 wherein each receiver sleeve further includes a guiding notch aligned with the slot and adapted to guide the detent as the upper leg portion is received into the receiver sleeve.

* * * * *